United States Patent [19]

Fouassier et al.

[11] 4,220,551
[45] Sep. 2, 1980

[54] NOVEL BLUE LIGHT EMITTING LUMINOPHORS

[75] Inventors: Claude Fouassier, Gradignan; Alain Garcia, Passage 'Agen; Bertrand Latourrette, Gagny, all of France

[73] Assignee: Rhone-Poulenc Industries, Paris, France

[21] Appl. No.: 56,344

[22] Filed: Jul. 10, 1979

[30] Foreign Application Priority Data

Jul. 28, 1978 [FR] France ................. 78 22351

[51] Int. Cl.$^2$ ............................................. C09K 11/46
[52] U.S. Cl. ........................ 252/301.4 F; 252/301.4 H
[58] Field of Search ................... 252/301.4 F, 301.4 H

[56] References Cited

U.S. PATENT DOCUMENTS 3,790,490  2/1974  Datta et al. .................... 252/301.4 F
4,128,498  12/1978  Hase et al. .................... 252/301.4 F

FOREIGN PATENT DOCUMENTS 1087655  10/1967  United Kingdom ............. 252/301.4 F
1414381  11/1975  United Kingdom ............. 252/301.4 H Primary Examiner—Jack Cooper
Attorney, Agent, or Firm—Burns, Doane, Swecker & Mathis

[57] ABSTRACT

Luminophors which luminesce in the blue region of the spectrum have the formula:

$$M_5(1-\alpha)Eu_{5\alpha}{}^{2+}SiO_4X_6$$

wherein M represents $Ba_{1-\beta}Sr_\beta$ or $Ba_{1-\beta}Ca_{\beta 2}$, with $0 \leq \beta \leq 0.1$ and $0 \leq \alpha \leq 0.2$, and X is $Cl_{1-\gamma}Br_\gamma$, with $0 \leq \gamma \leq 1$.

24 Claims, 6 Drawing Figures

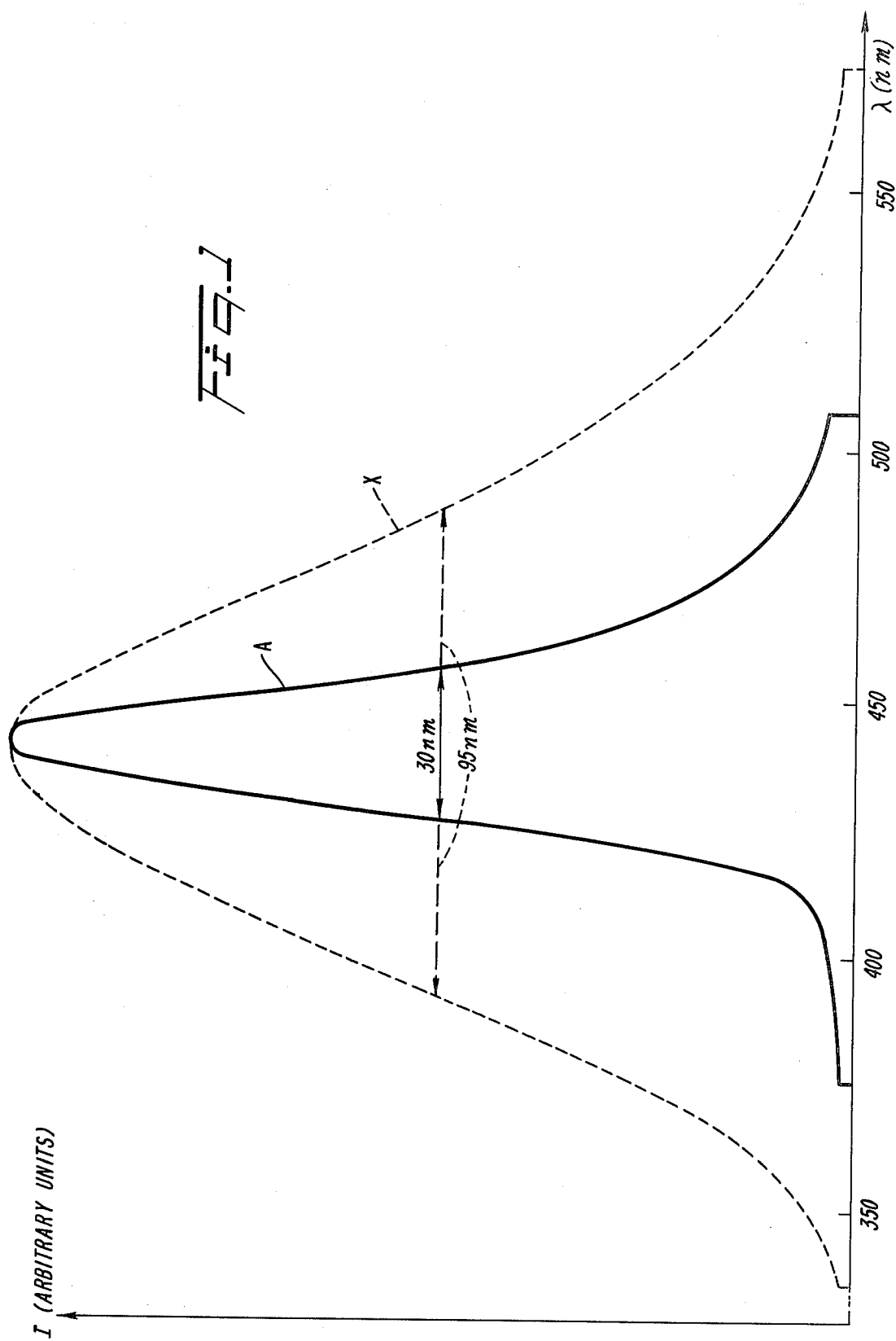

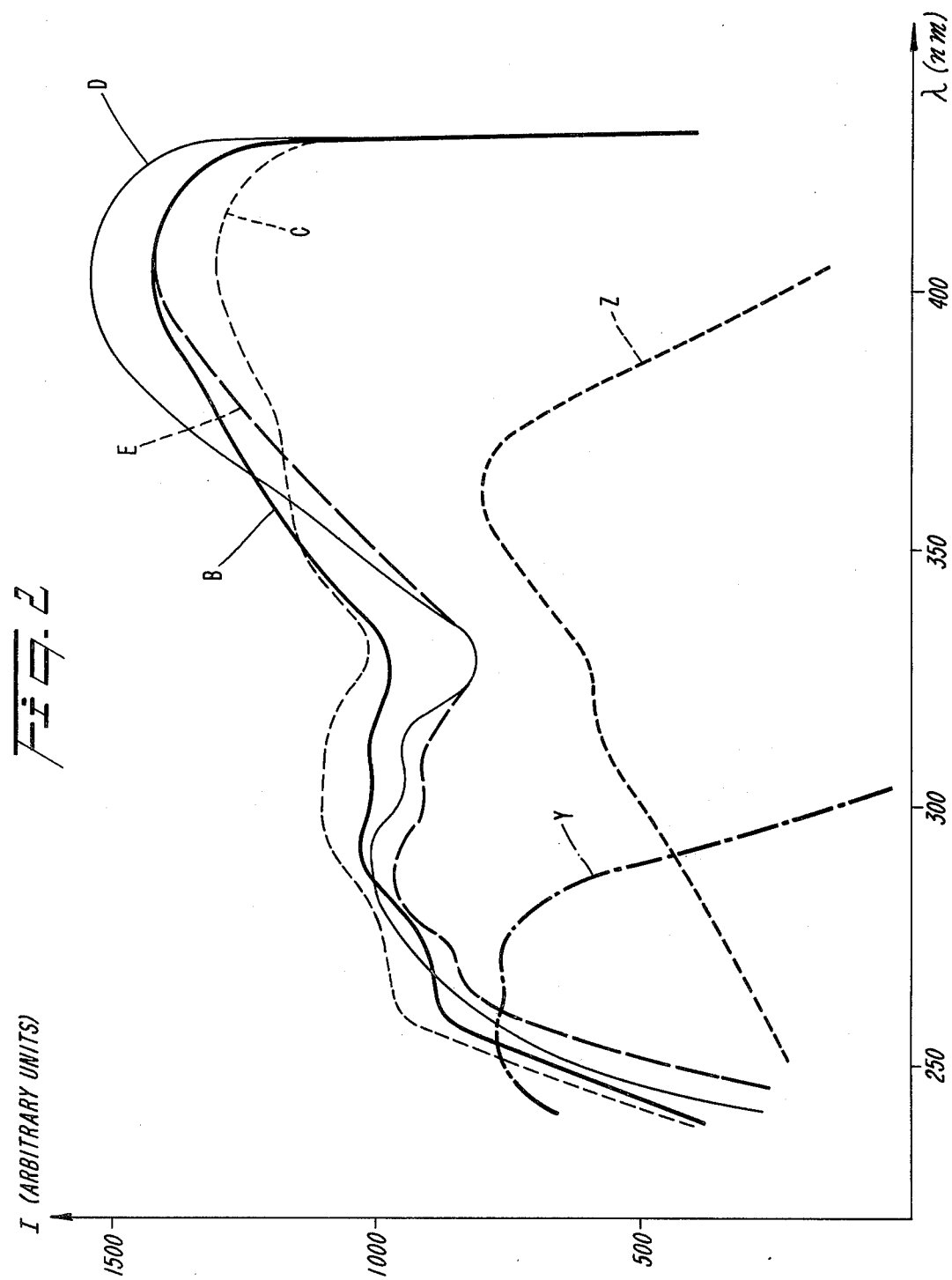

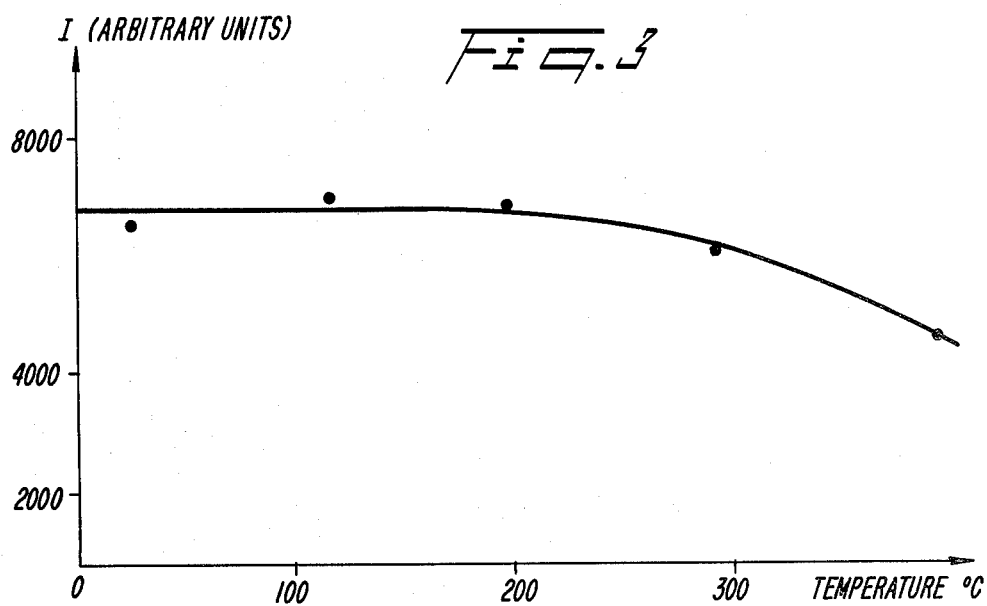
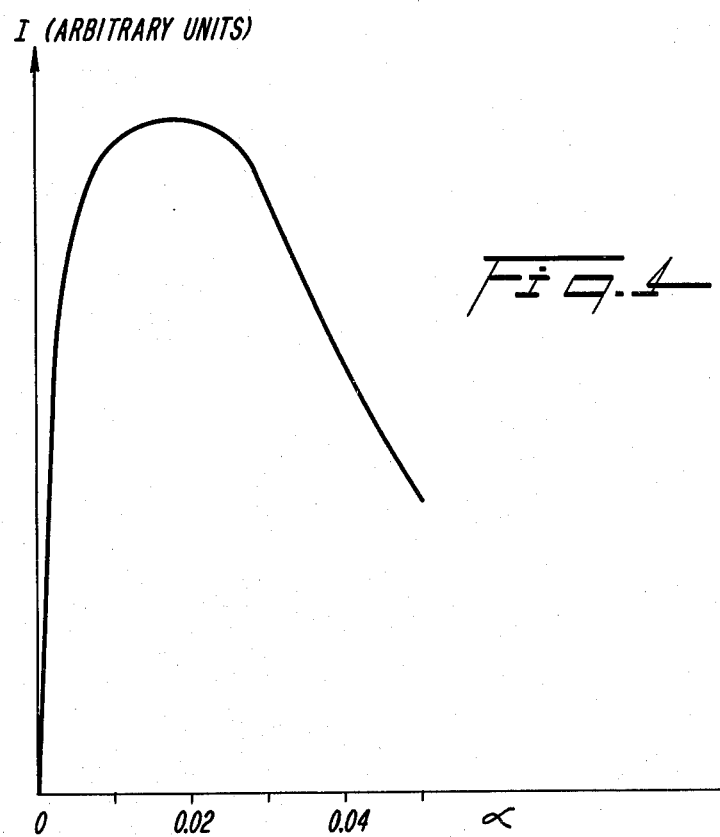

NOVEL BLUE LIGHT EMITTING LUMINOPHORS

BACKGROUND OF THE INVENTION

1. Field of the Invention

The present invention relates to novel divalent europium luminophors and, more especially, to novel divalent europium based luminophors which luminesce in the blue region of the spectrum. The invention also relates to a process for the preparation of such novel blue emitting luminophors, and to the utilization of such luminophors in systems principled on the emission of light of wavelength in the blue range when bombarded with electrons. For purposes of the description which follows, a "blue luminophor" is defined as a composition which, when suitably excited, emits light within the range of wavelengths comprised between about 430 nm and 500 nm. Such luminophors may be excited, for example, by ultraviolet radiation, by X-radiation, or by cathodic radiation.

2. Description of the Prior Art

A certain number of blue luminophors are known to this art. Thus, likely the presently most commercially important blue luminophors are $CaWO_4$:Pb and ZnS:Ag. These luminophors display, as their principal disadvantage, a very broad emission band, which results in the phenomenon that an impure color encompassing both violet and green light is realized. Furthermore, the blue luminophor $CaWO_4$:Pb cannot be excited by means of high pressure mercury tubes having their principal radiation at 365 nm. Insofar as ZnS:Ag is concerned, same indeed may be excited via high pressure mercury lamp radiation, but the intensity of the corresponding radiation is relatively low, thereby seriously delimiting practical application of such luminophor, especially in the field of illumination.

There are also known to the prior art certain matrices providing divalent europium luminscence in the blue range, for example, $Sr_5(PO_4)_3Cl$ and $Ca_2PO_4Cl$ matrices. The principal disadvantage of these phosphates is the fact that they provide, with europium, a blue luminescence with an intensity comparable to that of the luminophor, ZnS:Ag, and thus are not entirely satisfactory.

Accordingly, it will be appreciated that a serious need exists in this art for a luminophor which emits in the blue range having both a narrow range of emission and characterized by high intensity, as well as being capable of excitation upon irradiation with a broad range of wavelengths.

SUMMARY OF THE INVENTION

Thus, a major object of the present invention is the provision of a novel blue emitting luminophor, which novel luminophor both displays a narrow range of emission in the blue region of the spectrum and which emission is of high intensity.

Another object of this invention is to provide a novel luminophor which emits blue light under excitation from irradiation over a broad wavelength range.

Yet another object of the invention is to provide a novel blue emitting luminophor which is based upon divalent europium.

Briefly, the present invention features a blue emitting luminophor based on divalent europium, and characterized by the formula (I):

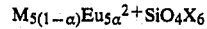

$$M_{5(1-\alpha)}Eu_{5\alpha}^{2+}SiO_4X_6 \qquad (I)$$

wherein M represents $Ba_{1-\beta}Sr_\beta$ or $Ba_{1-\beta}Ca_\beta$, with $\beta$ being greater than or equal to 0 and less than or equal to approximately 0.1 ($0 \leq \beta \leq 0.1$); $\alpha$ is greater than 0 and less than or equal to approximately 0.2 ($0 \leq \alpha \leq 0.2$); and X represents $Cl_{1-\gamma}Br_\gamma$, with $\gamma$ being greater than or equal to 0 and less than or equal to approximately 1 ($0 \leq \gamma \leq 1$).

BRIEF DESCRIPTION OF THE DRAWINGS

FIG. 1 is a graph comparison of the emission spectra of the luminophors according to the invention vis-a-vis the prior art blue emitting luminophors;

FIG. 2 is a graph comparison of the variations in intensity of emission band maxima as a function of the wavelength of excitation, also of the luminophors according to the invention vis-a-vis the prior art blue emitting luminophors;

FIG. 3 is a graphical representation of the variation in intensity, under constant wavelength excitation, as a function of temperature, of a novel luminophor according to the invention;

FIG. 4 is a graphical representation of the variation in intensity as a function of $\alpha$, with $\beta$ and $\gamma$ being zero, of a novel luminophor according to the invention;

DETAILED DESCRIPTION OF THE INVENTION

Figure 5:
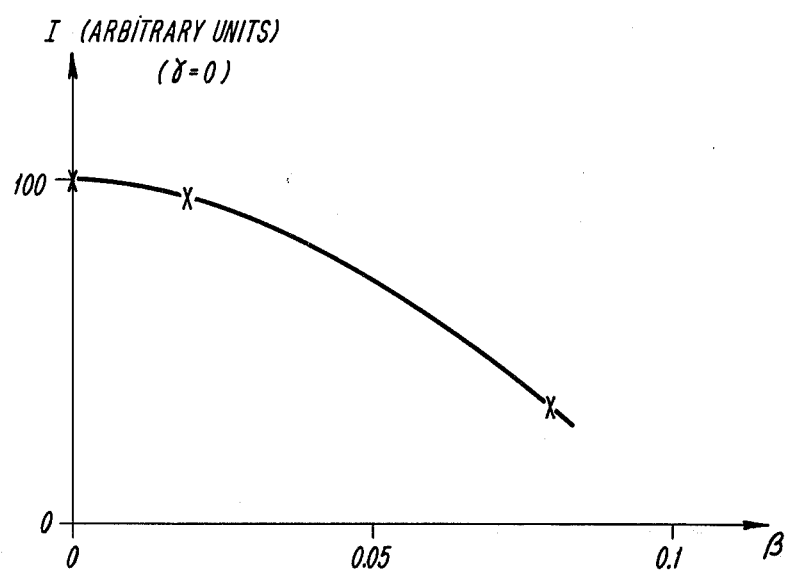
FIG. 5 is a graphical representation of the variation in intensity as a function of $\beta$, with $\alpha$ being 0.02 and $\gamma$ being zero, of a novel luminophor according to the invention.

More particularly according to the invention, $\alpha$ is preferably comprised between approximately 0.003 and approximately 0.03, while $\beta$ is preferably greater than or equal to 0 and less than or equal to approximately 0.05.

Even more preferred embodiments of the invention are such luminophors of the aforenoted formula wherein $\alpha$ is comprised between approximately 0.003 and approximately 0.03 and wherein $\beta=0$.

The most preferred luminophors according to the invention are those wherein $\beta=0$ and $\alpha=0.02$, and which correspond to the following general formula:

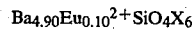

$$Ba_{4.90}Eu_{0.10}^{2+}SiO_4X_6$$

Another embodiment of the invention features a process for the preparation of the Formula I luminophors, which process is characterized in that an intimate admixture comprising:

[i] silica;

[ii] a barium/oxygen compound, where possibly including either a strontium/oxygen compound or a calcium/oxygen compound

[iii] a barium chloride (or bromide) compound, where possibly including either a strontium chloride (or bromide) compound or a calcium chloride (or bromide) compound and

[iv] an europium compound and is subjected to at least one heat treatment, in a reducing medium, at a temperature between approximately 700°

C. and approximately 850° C. for a period of time between approximately 1 hour and approximately 25 hours, each such heat treatment advantageously being followed by a grinding of the admixture.

In one variant of the process of the invention, prior to the heat treatment in the reducing environment, at least one heat treatment is effected, under an inert atmmosphere, at a temperature between approximately 700° C. and approximately 850° C., for a period of time between approximately 1 hour and approximately 25 hours, each heat treatment advantageously being followed by grinding of the product.

The advantage of the immediately foregoing variant lies in the fact that it makes it possible to reduce the duration of the treatment in the reducing medium.

According to a preferred embodiment of the process according to the invention, the aforesaid admixture is exposed to a first heat treatment under an inert atmosphere at a temperature between approximately 750° C. and approximately 820° C., for approximately 15 to 20 hours, and, after grinding, to a second heat treatment under a reducing atmosphere at a temperature between approximately 750° C. and 820° C., for approximately 1 to 5 hours.

Preferably, the barium/oxygen compound according to the invention is selected from the group comprising barium oxide, BaO, barium carbonate, $BaCO_3$, and barium nitrate, $Ba(NO_3)_2$; the strontium/oxygen compound is preferably selected from the group comprising strontium oxide, SrO, strontium carbonate, $SrCO_3$, and strontium nitrate, $Sr(NO_3)_2$; the calcium/oxygen compound is preferably selected from the group comprising calcium oxide, CaO, calcium carbonate, $CaCO_3$, and calcium nitrate, $Ca(NO_3)_2$; the europium compound is preferably selected from the group comprising europium oxide, $Eu_2O_3$, the europium chlorides, $EuCl_2$ and $EuCl_3$, the europium bromides, $EuBr_2$ and $EuBr_3$ and europium nitrate, $Eu(NO_3)_3$.

It will be appreciated that any one of the starting material compounds, particularly the oxides, may be replaced by mineral salts capable of effecting formation, in situ, of such starting material compounds under the conditions of the reaction. Nevertheless, it too will be appreciated that the starting materials comprise at least one X donor, i.e., barium chloride and/or bromide, strontium chloride and/or bromide, or calcium chloride and/or bromide.

While the reaction pressure is not critical, the process of the invention is typically effected under atmospheric pressure.

The heat treatment under an inert atmosphere is typically effected under a nitrogen or argon blanket and the heat treatment in the reducing medium is under a hydrogen (or argon with a few percent of hydrogen) atmosphere or in a carbon boat wherein the reaction mixture is deposited.

Yet another feature of the invention is the utilization of the subject luminophors in any system keyed to luminescence within the aforenoted spectral range. Thus, under ultraviolet excitation and luminophors according to the invention (and more particularly those wherein $\alpha = 0.02$ and $\beta = 0$) may be used for illumination in fluorescent devices, in particular in trichromatic tubes or lamps, and to otherwise obtain blue light, particularly in the field of diazocopying, or for medical treatments, such as the treatment of hyperbilirubinemia. With X-ray excitation, the subject luminophors may be used in the manufacture of reinforcing screens for X-rays in the field of medical radiography. Finally, under cathodic excitation, the luminophors according to the invention may be used in multichromatic visual devices, particularly for television.

The blue emitting luminophors according to the invention are characterized by a narrow emission band width and by high emission intensity. Concerning excitation, the substances have the advantage in that they may be excited over a broad range of wavelengths; they may thus be excited both by means of irradiation from low pressure mercury lamps (principal radiation at 253.7 nm) and by irradiation from high pressure mercury lamps (principal radiation at 365 nm).

Another advantage of the topic luminophors is that, as will be more fully demonstrated hereinbelow, the thermal variation in emission therefrom evidences that such materials are compatible with devices which operate at temperatures higher than ambient temperature.

In order to further illustrate the present invention and the advantages thereof, the following specific examples are given, it being understood that same are intended only as illustrative and in nowise limitative.

EXAMPLE 1

Preparation of $Ba_{4.90}Eu_{0.10}{}^{2+}SiO_4Cl_6$ ($\alpha = 0.02$; $\beta = 0$; $\gamma = 0$):

The following compounds were intimately dry mixed: 2.2498 g $BaCO_3$; 4.3970 g $BaCl_2.2H_2O$; 0.3605 g $SiO_2$ and 0.1056 g $Eu_2O_3$. The mixture was ground until a homogeneous powder was obtained.

The powder was introduced into an alumina boat which was placed into a furnace; the furnace was heated to 800° C. and maintained at this temperature for 20 hours under nitrogen flow.

The resulting product was ground until a fine powder was obtained, which was again placed into the furnace. Same was maintained therein at 800° C. for 2 hours under a hydrogen flow.

A white powder, in an amount of 5.9 g, was obtained, said powder being insensitive to the effects of atmospheric humidity.

The compound obtained had the formula $Ba_{4.90}Eu_{0.10}{}^{2+}SiO_4Cl_6$ and was characterized by the X-ray diffraction spectrum presented hereinbelow, indexed on the basis of a monoclinic lattice having the following parameters: $a = 9.45 \pm 0.05$ Å; $b = 14.75 \pm 0.05$ Å; $c = 11.69 \pm 0.05$ Å; $\beta = 104.39° \pm 0.05°$.

TABLE I

X-Ray Diffraction Spectrum of $Ba_{4.90}Eu_{0.10}{}^{2+} SiO_4 Cl_6$

| I | $d_{obs.}$ Å | $d_{calc.}$ Å | h k l |
|---|---|---|---|
| 15 | 7.16 | 7.157 | 1 1 $\bar{1}$ |
| 15 | 6.19 | 6.181 | 0 2 1 |
| 35 | 4.58 | 4.579 | 2 0 0 |
| 75 | 4.18 | 4.179 | 1 1 2 |
| 10 | 4.09 | 4.092 | 2 0 $\bar{2}$ |
| 100 | 3.93 | 3.944 | 2 2 $\bar{1}$ |
| 45 | 3.90 | 3.890 | 2 2 0 |
| 50 | 3.72 | 3.719 | 1 1 $\bar{3}$ |
| 30 | 3.69 | 3.688 | 0 4 0 |
| 15 | 3.65 | 3.655 | 1 3 $\bar{2}$ |
| 20 | 3.58 | 3.578 | 2 2 $\bar{2}$ |
| 45 | 3.50 | 3.507 | 0 4 1 |
| 80 | 3.258 | 3.261 | 1 3 2 |
| 10 | 3.190 | 3.194 | 2 0 2 |
| 40 | 3.087 | 3.091 | 0 4 2 |
| 65 | 3.027 | 3.028 | 1 3 $\bar{3}$ |
| 60 | 2.988 | 2.989 | 3 1 0 |
| 10 | 2.928 | 2.931 | 2 2 2 |
| 15 | 2.864 | 2.863 | 1 1 $\bar{4}$ |
| 15 | 2.803 | 2.808 | 1 5 0 |
| 15 | 2.773 | 2.775 | 1 5 $\bar{1}$ |

TABLE I-continued

X-Ray Diffraction Spectrum of $Ba_{4.90}Eu_{0.10}{}^{2+}SiO_4Cl_6$

| I | $d_{obs.}$ Å | $d_{calc.}$ Å | h k l |
|---|---|---|---|
| 60 | 2.736 | 2.739 | 2 4 $\bar{2}$ |
| 60 | 2.728 | 2.731 | 3 1 1 |
| 65 | 2.680 | 2.678 | 1 5 1 |
| 30 | 2.642 | 2.644 | 0 2 4 |
| 10 | 2.594 | 2.594 | 3 3 0 |
| 10 | 2.572 | 2.572 | 3 3 $\bar{2}$ |

EXAMPLE 2

Preparation of $Ba_{4.975}Eu_{0.025}{}^{2+}SiO_4Cl_6$ ($\alpha=0.005$; $\beta=0$; $\gamma=0$):

The mode of preparation was as in Example 1, but utilizing 1.8171 g BaO, 3.7485 g $BaCl_2$, 0.3605 g $SiO_2$ and 0.0264 g $Eu_2O_3$.

A white powder, in an amount of 5.8 g, and insensitive to atmospheric humidity, was obtained.

EXAMPLE 3

Preparation of $Ba_{4.80}Sr_{0.10}Eu_{0.10}{}^{2+}SiO_4Cl_6$; ($\alpha=0.02$; $\beta=0.02$; $\gamma=0$):

The mode of preparation was as in Example 1, but utilizing 2.1314 g $BaCO_3$, 0.0886 g $SrCo_3$, 4.3970 g $BaCl_2.2H_2O$, 0.3605 g $SiO_2$ and 0.1056 g $Eu_2O_3$.

The first heat treatment, under a nitrogen flow, was effected at 800° C. for 20 hours, the second, under a hydrogen flow at 800° C., for 5 hours.

A white powder, in an amount of 5.8 g, and insensitive to atmospheric humidity, was obtained.

EXAMPLE 4

Preparation of $Ba_{4.90}Eu_{0.10}{}^{2+}SiO_4Br_6$ ($\alpha=0.02$; $\beta=0$; $\gamma=1$):

2.2287 g $BaBr_2$ and 0.9206 g $Ba_{1.90}Eu_{0.10}{}^{2+}SiO_4$ were mixed together in the dry state.

The mixture was ground until a homogeneous powder was obtained. The powder was introduced into an alumina boat which was placed in a furnace; the furnace was heated to 800° C. and maintained at this temperature for 45 hours under a reducing atmosphere consisting of a mixture of argon with 10% hydrogen. A very slightly rose colored white powder, in an amount of 3.149 g, and insensitive to the effects of atmospheric humidity, was obtained.

The compound obtained had the formula of $Ba_{4.90}Eu_{0.10}{}^{2+}SiO_4Br_6$ and was characterized by the X-ray diffraction spectrum presented hereinbelow, indexed on the basis of a monoclinic lattice having the following parameters:

a = 9.75 ± 0.05 Å
b = 15.22 ± 0.05 Å
c = 12.07 ± 0.05 Å
β = 104.7° ± 0.5°

EXAMPLE 5

Preparation of $Ba_{4.85}Eu_{0.15}{}^{2+}SiO_4Br_6$ ($\alpha=0.03$; $\beta=0$; $\gamma=1$):

The mode of operation was as in Example 1, but utilizing 2.9987 $BaBr_2.2H_2O$ and 1.1069 g $Ba_{1.85}Eu_{0.15}{}^{2+}SiO_4$ and effecting the first two heat treatments at 800° C. for 15 hours, under nitrogen flow, and a third heat treatment at 800° C. for 5 hours under a flow of the reducing gas consisting of argon containing 10% hydrogen. Grinding was performed after each heat treatment.

TABLE II

X-Ray Diffraction Spectrum of $Ba_{4.90}Eu_{0.10}{}^{2+}SiO_4Br_6$

| I | $d_{obs.}$ Å | $d_{calc.}$ Å | h k l |
|---|---|---|---|
| 15 | 7.41 | 7.395 | 1 1 $\bar{1}$ |
| 10 | 6.38 | 6.373 | 0 2 1 |
| 15 | 5.80 | 5.836 | 0 0 2 |
| 15 | 4.73 | 4.715 | 2 0 0 |
| 50 | 4.28 | 4.296 | 1 1 2 |
| 55 | 4.08 | 4.070 | 2 2 $\bar{1}$ |
| 50 | 4.01 | 4.008 | 2 2 0 |
| 30 | 3.84 | 3.841 | 1 1 $\bar{3}$ |
| 10 | 3.81 | 3.804 | 0 4 0 |
| 35 | 3.70 | 3.698 | 2 2 $\bar{2}$ |
| 30 | 3.62 | 3.617 | 0 4 1 |
| 30 | 3.35 | 3.357 | 1 3 2 |
| 15 | 3.27 | 3.282 | 2 0 2 |
| 70 | 3.182 | 3.186 | 0 4 2 |
| 70 | 3.12 | 3.126 | 1 3 $\bar{3}$ |
| 100 | 3.08 | 3.078 | 3 1 0 |
| 30 | 3.00 | 3.014 | 2 2 2 |
| 10 | 2.95 | 2.955 | 1 1 $\bar{4}$ |
| 25 | 2.90 | 2.896 | 1 5 0 |
| 35 | 2.86 | 2.864 | 1 5 $\bar{1}$ |
| 100 | 2.83 | 2.829 | 2 4 $\bar{2}$ |
| 70 | 2.81 | 2.809 | 3 1 1 |
| 100 | 2.758 | 2.761 | 1 5 1 |
| 70 | 2.720 | 2.724 | 0 2 4 |
| 30 | 2.663 | 2.656 | 3 3 $\bar{2}$ |

A powder in an amount of 3.7812 g, and insensitive to the effects of atmospheric humidity, was obtained.

EXAMPLE 6

Preparation of $Ba_{4.90}Eu_{0.10}{}^{2+}SiO_4Br_6$ ($\alpha=0.02$; $\beta=0$; $\gamma=1$):

As in Example 1, 1.1249 g $BaCO_3$, 0.0528 g $Eu_2O_3$, 0.1803 g $SiO_2$ and 2.9987 $BaBr_2.2H_2O$ were mixed in the dry state.

The mixture was exposed to two heat treatments for 15 hours at 800° C. under nitrogen flow and to a third heat treatment at 800° C. for 5 hours under a reducing atmosphere consisting of hydrogen, each heat treatment being followed by grinding.

A powder in an amount of 3.7791 g, and insensitive to the effects of atmospheric humidity, was obtained.

EXAMPLE 7

Preparation of $Ba_{4.80}Sr_{0.10}Eu_{0.10}{}^{2+}SiO_4Cl_{5.70}Br_{0.30}$ ($\alpha=0.02$; $\beta=0.02$; $\gamma=0.05$):

The preparation was carried out as in Example 3, but utilizing 2.1314 g $BaCO_3$, 0.1270 g $Sr(NO_3)_2$, 4.1772 g $BaCl_2.2H_2O$, 0.2028 g $Eu(NO_3)_3$, 0.3605 g $SiO_2$ and 0.2836 g $BaBr_2.2H_2O$.

A white powder, insensitive to atmospheric humidity, was obtained, in an amount of 5.9 g.

EXAMPLE 8

Preparation of $Ba_{4.85}Ca_{0.05}Eu_{0.10}{}^{2+}SiO_4Cl_6$ ($\alpha=0.02$; $\beta=0.01$; $\gamma=0$):

The mode of preparation was as in Example 3, but utilizing 2.1905 g $BaCO_3$, 0.0300 g $CaCO_3$, 4.3970 g $BaCl_2.2H_2O$, 0.3605 g $SiO_2$ and 0.1056 g $Eu_2O_3$.

A white powder, insensitive to atmospheric humidity, was obtained, in an amount of 5.8 g.

EXAMPLE 9

Comparison of the emission spectra of the luminophors according to the invention with the emission spectrum of a prior art luminophor:

FIG. 1 compares the spectrum of $Ba_{4.90}Eu_{0.10}{}^{2+}SiO_4Cl_6$ (curve A according to the invention) with that of $CaWO_4:Pb$ (curve X according to the prior art).

It will be seen that the width of the emission band of the luminophor according to the invention (30 nm at mid-height) is much narrower than that of the prior art luminophor (95 nm at mid-height).

It was also found that the spectra of all other luminophors within the ambit of the invention were essentially identical to the spectrum of $Ba_{4.90}Eu_{0.10}{}^{2+}SiO_4Cl_6$.

EXAMPLE 10

Comparison of the excitation spectra of the luminophors according to the invention with the excitation spectra of various prior art luminophors:

In FIG. 2, the variations in intensity of the maximum of the emission band as a function of the excitation wavelength are shown for certain luminophors of the invention, i.e., those of Examples 1 (curve B), 3 (curve C), 4 (curve D), 7 (curve E), and for the $CaWO_4:Pb$ (curve Y) and ZnS:Ag (curve Z) prior art luminophors.

It is thus clearly apparent per FIG. 2 that the blue emitting luminophors according to the invention are characterized by an emission that is substantially more intense than that of the prior art and that same may be excited over a much broader wavelength range.

EXAMPLE 11

Variation, with temperature, of the intensity of emission of the luminophors according to the invention:

FIG. 3 reflects the variation in intensity, under excitation of constant wavelength (365 nm), as a function of temperature, with respect to the luminosphor of Example 1 having the formula $Ba_{4.90}Eu_{0.10}{}^{2+}SiO_4Cl_6$.

It was determined that the luminescence begins to significantly decline only at temperatures in excess of 300° C. (at 300° C. same was still equal to 90% of the intensity at ambient temperature).

In the case of numerous of the prior art blue emitting luminophors based on divalent europium, the luminiscence of the $Eu^{2+}$ ion markedly diminishes at temperatures in excess of 100° C.

EXAMPLE 12

Intensity as a function of the percentage of divalent europium in the luminophors according to the intention, under ultraviolet excitation:

FIG. 4 illustrates variations in intensity as a function of $\alpha$, with $\beta$ and $\gamma$ being zero.

EXAMPLE 13

Intensity as a function of the percentage of strontium in the luminophors of the invention, under ultraviolet excitation:

FIG. 5 illustrates the variation in intensity as a function of $\beta$, with $\alpha$ being equal to 0.02 and $\gamma$ being zero.

EXAMPLE 14

Figure 6:
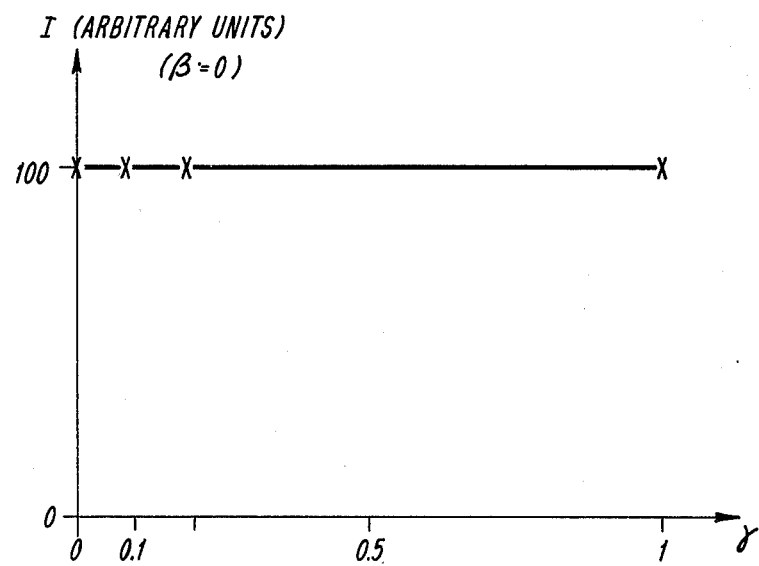
FIG. 6 is a graphical representation of the variation in intensity as a function of $\gamma$, with $\alpha$ being 0.02 and $\beta$ being zero, also of a novel luminophor according to the invention.

Intensity as a function of the percentage of bromine in the luminophors according to the invention, under ultraviolet excitation:

FIG. 6 illustrates the variation in intensity as a function of $\gamma$, with $\alpha$ being equal to 0.02 and $\beta$ being zero.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A luminophor having the formula:

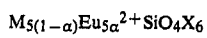
$$M_{5(1-\alpha)}Eu_{5\alpha}{}^{2+}SiO_4X_6$$

wherein M represents $Ba_{1-\beta}Sr_\beta$ or $Ba_{1-\beta}Ca_\beta$, with $\beta$ being greater than or equal to 0 and less than or equal to about 0.1; $\alpha$ is greater than 0 and less than or equal to about 0.2; and X represents $Cl_{1-\gamma}Br_\gamma$, with $\gamma$ being greater than or equal to 0 and less than or equal to about 1 and wherein $Eu^{2+}$ is present in amount sufficient to effect a narrow emission band spectrum that is essentially the same as curve A of FIG. 1.

2. The luminophor as defined by claim 1, wherein $\alpha$ ranges from about 0.003 to about 0.03.

3. The luminophor as defined by claim 1, wherein $\beta$ ranges from about 0 to about 0.05.

4. The luminophor as defined by claim 1, wherein $\alpha$ ranges from about 0.003 to about 0.03, $\beta$ is 0.

5. The luminophor as defined by claim 4, wherein $\alpha$ is 0.02, $\beta$ is 0.

6. The luminophor as defined by claim 1, having the formula:

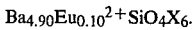
$$Ba_{4.90}Eu_{0.10}{}^{2+}SiO_4X_6.$$

7. The luminophor as defined by claim 1, having the formula:

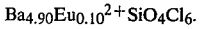
$$Ba_{4.90}Eu_{0.10}{}^{2+}SiO_4Cl_6.$$

8. The luminophor as defined by claim 1, having the formula:

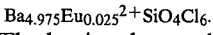
$$Ba_{4.975}Eu_{0.025}{}^{2+}SiO_4Cl_6.$$

9. The luminophor as defined by claim 1, having the formula:

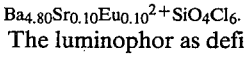
$$Ba_{4.80}Sr_{0.10}Eu_{0.10}{}^{2+}SiO_4Cl_6.$$

10. The luminophor as defined by claim 1, having the formula:

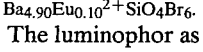
$$Ba_{4.90}Eu_{0.10}{}^{2+}SiO_4Br_6.$$

11. The luminophor as defined by claim 1, having the formula:

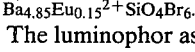
$$Ba_{4.85}Eu_{0.15}{}^{2+}SiO_4Br_6.$$

12. The luminophor as defined by claim 1, having the formula:

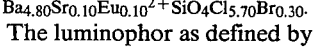
$$Ba_{4.80}Sr_{0.10}Eu_{0.10}{}^{2+}SiO_4Cl_{5.70}Br_{0.30}.$$

13. The luminophor as defined by claim 1, having the formula:

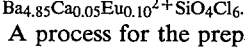
$$Ba_{4.85}Ca_{0.05}Eu_{0.10}{}^{2+}SiO_4Cl_6.$$

14. A process for the preparation of the luminophor as defined by claim 1, comprising subjecting an intimate admixture of (i) silica, (ii) a member selected from the group consisting of a barium/oxygen compound and a mixture of a barium/oxygen compound with a strontium/oxygen compound or a calcium/oxygen compound, (iii) a member selected from the group consisting of barium chloride or bromide and a mixture of a barium chloride or bromide with a strontium chloride or bromide or calcium chloride or bromide, and (iv) a europium compound, to at least one heat treatment at a temperature of from about 700° to 850° C., for from about 1 to 25 hours in a reducing medium.

15. The process as defined by claim 14, wherein at least one said heat treatment is followed by a grinding of the resultant product.

16. The process as defined by claim 14, wherein, prior to the at least one heat treatment in the reducing medium, the intimate admixture is subjected to at least one heat treatment under an inert atmosphere at a temperature of from about 700° C. to 850° C., for from about 1 hour to 25 hours.

17. The process as defined by claim 16, wherein the intimate admixture is subjected in a first stage to a heat treatment under an inert atmosphere at a temperature of from about 750° C. to 820° C., for from about 15 hours to 20 hours, and then, after grinding of the resultant product, in a second stage, to a heat treatment under a reducing atmosphere at a temperature of from about 750° C. to 820° C., for from about 1 hour to 5 hours.

18. The process as defined by claim 14, wherein the barium/oxygen compound is selected from the group consisting of barium oxide, barium carbonate and barium nitrate.

19. The process as defined by claim 14, wherein the strontium/oxygen compound is selected from the group consisting of strontium oxide, strontium carbonate and strontium nitrate.

20. The process as defined by claim 14, wherein the calcium/oxygen compound is selected from the group consisting of calcium oxide, calcium carbonate and calcium nitrate.

21. The process as defined by claim 14, wherein the europium compound is selected from the group consisting of $Eu_2O_3$, $EuCl_2$, $EuCl_3$, $EuBr_2$, $EuBr_3$ and $Eu(NO_3)_3$.

22. The process as defined by claims 14 or 17, wherein the reducing medium comprises hydrogen gas.

23. The process as defined by claim 16, wherein the inert atmosphere comprises nitrogen gas.

24. The process as defined by claim 16, wherein the intimate admixture comprises barium carbonate, barium chloride, silica and europium oxide, that same is first ground until a fine powder is obtained, that the admixture is next subjected to a temperature of about 800° C. for about 20 hours under a nitrogen atmosphere, that the resulting product is ground until a fine powder is obtained and that such powder is treated at a temperature of about 800° C. for about 2 hours under a hydrogen atmosphere.

* * * * *